Oct. 28, 1930.  R. BACCELLIERI ET AL  1,779,580
MACARONI MACHINE
Filed March 8, 1928   3 Sheets-Sheet 1
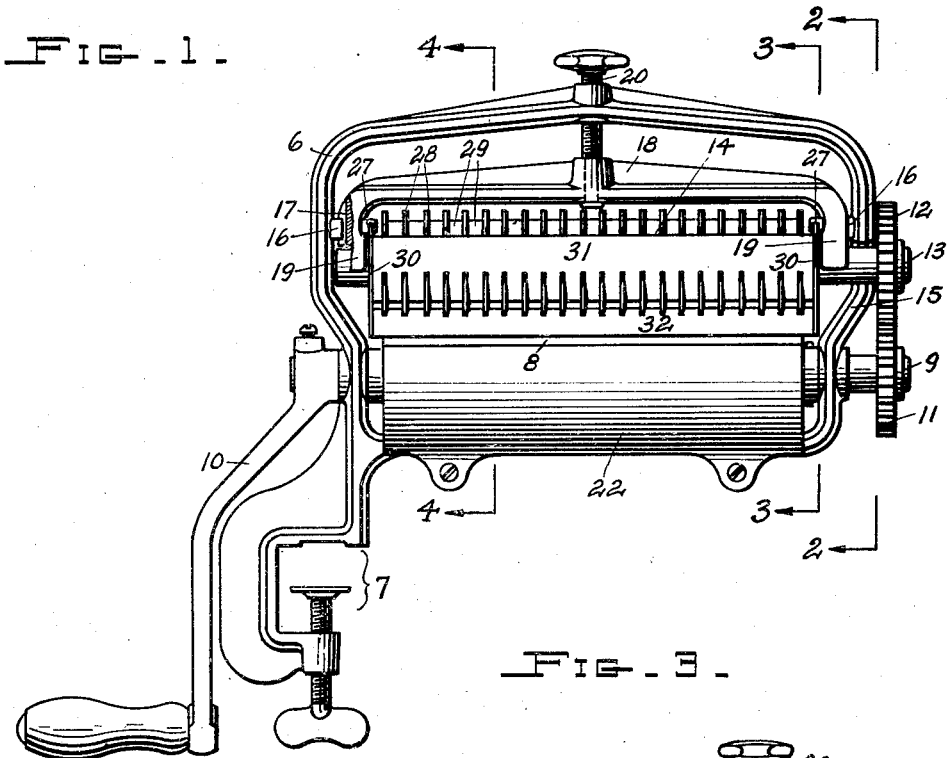
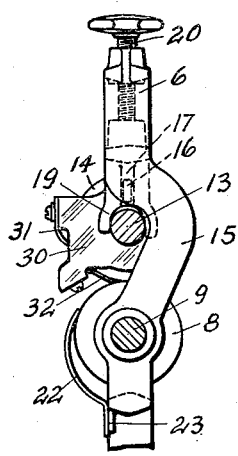
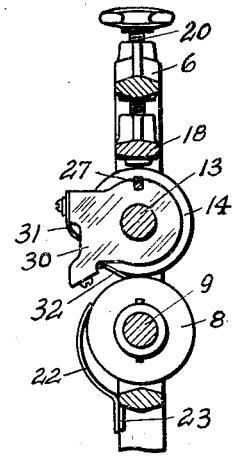
WITNESSES:
Gerhard Bourk
W. P. Murill
INVENTORS:
Raffaele Baccellieri
& Augusto De Rentiis,
BY
Joshua R. H. Potts
ATTORNEY.

Oct. 28, 1930. R. BACCELLIERI ET AL 1,779,580
MACARONI MACHINE
Filed March 8, 1928  3 Sheets-Sheet 2

WITNESSES:
Gerhard Baule
W. P. Merrill

INVENTORS:
Raffaele Baccellieri
& Augusto De Rentiis,
BY
Joshua R. H. Potts
ATTORNEY.

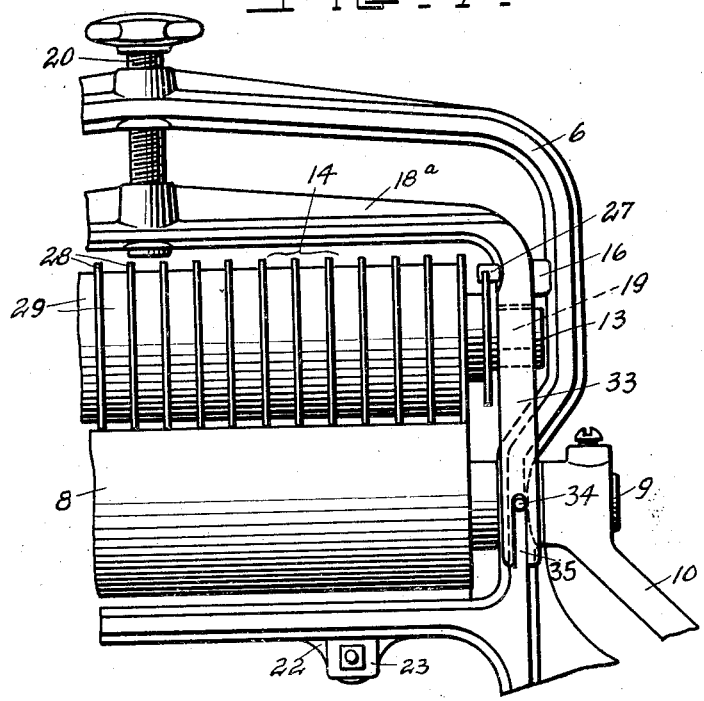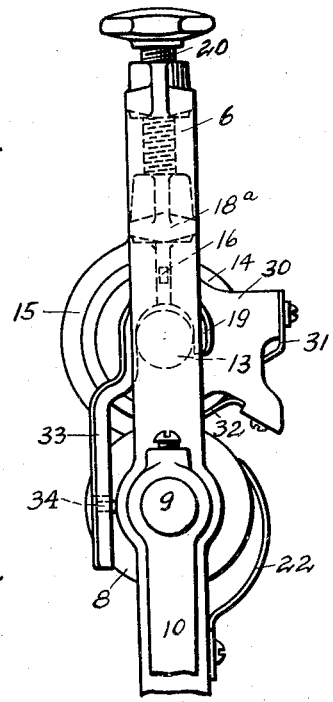

Patented Oct. 28, 1930

1,779,580

UNITED STATES PATENT OFFICE

RAFFAELE BACCELLIERI, OF PHILADELPHIA, AND AUGUSTO DE RENTIIS, OF COLLINGDALE, PENNSYLVANIA; SAID DE RENTIIS ASSIGNOR TO BACCELLIERI BROS., OF PHILADELPHIA, PENNSYLVANIA

MACARONI MACHINE

Application filed March 8, 1928. Serial No. 259,949.

Our invention relates to machines for making flat macaroni or noodles and more particularly to a machine of this character primarily intended for household use.

The object of the invention is to provide a machine which will positively separate the strips of dough after they have been cut and from which one of the rolls may be easily and quickly removed.

Figure 4:
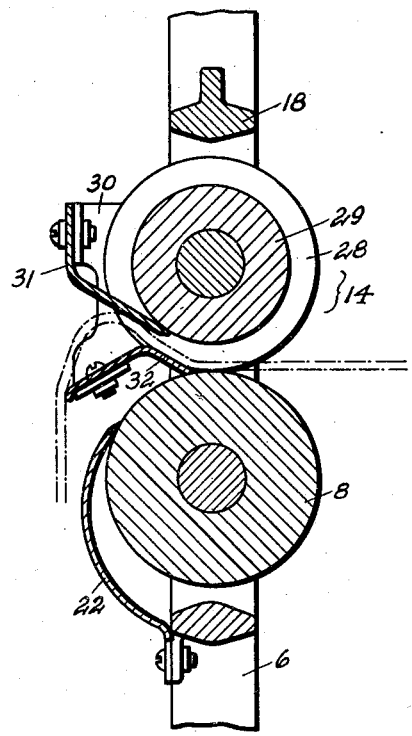

The invention resides in the features of construction and arrangement of elements hereafter described and claimed, and illustrated by the embodiments shown in the accompanying drawings, in which Fig. 1 is a front view, partly broken away, of a macaroni machine made in accordance with our invention, Fig. 2 a sectional end view, taken on line 2—2 on Fig. 1, Fig. 3 a cross-sectional view taken on line 3—3 on Fig. 1, and Fig. 4 an enlarged cross-sectional view taken on line 4—4 on Fig. 1.

Figure 5:
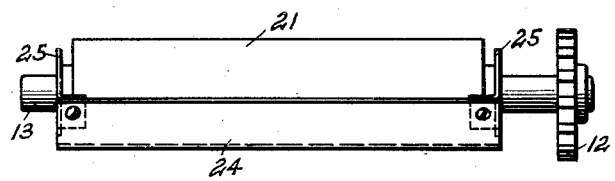

Fig. 5 is a front view of an interchangeable roll, and

Figure 6:
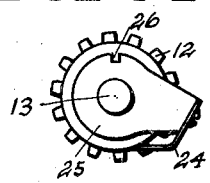

Fig. 6 an end view thereof.

Fig. 7 is a fragmentary rear view of a machine similar to the one shown in Fig. 1 but showing a modification, and Fig. 8 an end view of this machine, looking from the right of Fig. 7.

Our improved machine has a frame 6 which is preferably made in one piece and provided with an attaching clamp 7. A stationary roll 8 has its axle 9 rotatably mounted in the frame and provided at one end with a crank 10 and at its other end with a gear 11 which meshes with a gear 12 fixed on the shaft 13 of a top roll, resting upon roll 8. The top roll may be a plain roll or the cutting roll 14 shown in Fig. 1. One side of the frame is provided with a bend 15 through which axle 13 extends so that the top roll may be quickly removed or replaced.

Lugs 16 are formed on the frame and extend into guideways 17 in the ends of a guide bar 18 which has an open-sided bearing 19 formed on each end and partially encircling axle 13 for holding the top roll in position. The guide bar is raised and lowered and the pressure between the rolls regulated by an adjusting screw 20 threaded through the top of the frame and rotatably secured in the guide bar. By turning the adjusting screw until the guide bar is raised sufficiently for the lower edges of bearings 19 to clear axle 13, the top roll may be removed from the frame by rolling it down over the surface of roll 8 until axle 13 is clear of bend 15.

Each machine is preferably provided with several cutting rolls, for cutting the dough into strips of different widths, and with a plain roll 21, as shown in Fig. 5. Each roll is secured to an axle 13 having a gear 12 fixed thereon and carrying a scraper for clearing the roll from any dough which may adhere to it.

Roll 8 is cleared of dough by a scraper 22, secured to lugs 23, formed on the frame, and plain roll 21 by a scraper 24 secured to scraper supports 25 carried by its axle. When the roll is mounted in the frame, a notch 26 in each scraper support will engage a lug 27 on guide bar 18 and hold the scraper against rotation.

Each cutting roll consists of a series of disks 28 mounted on an axle 13 and separated by spacers 29 which form the body of the roll. A pair of scraper supports 30 are mounted upon the axle of the roll and support a scraper 31 which engages the peripheries of spacers 29 and has a series of slots through which disks 28 extend. When the cutting roll is mounted in the machine, lugs 27 engage notches in scraper supports 30 and hold them against rotation.

Machines heretofore produced, which employ cutting rolls of the type illustrated, do not separate the strips of dough and require that high pressure be maintained between the cutting and stationary rolls. So much power is required to turn the rolls under these conditions that it is necessary to use very short rolls in hand operated machines.

In order to overcome the above objectionable features, a slotted presser bar 32 is mounted upon scraper supports 30 and engages the top of roll 8, the slots having the same spacing as disks 28 and being but slightly wider than the thickness of the disks. As the sheet of dough is fed between rolls 8 and 14, it is cut into strips by the disks, raised by the inner edge of presser bar 32, forced between the disks so that the strips are positively separated, and then forced from between the disks by scraper 31. Only a relatively light pressure is required between rolls 8 and 14 so that but little power is required to operate the machine, allowing the use of longer rolls.

In operating the machine, plain roll 21 is mounted in bearings 19 and screw 20 adjusted to regulate the thickness of the sheet of dough to be rolled. After the dough is rolled into a sheet, adjusting screw 20 is turned to raise guide bar 18 and roll 21 removed. A cutting roll is then placed in position with the notches in its scraper supports 30 engaging lugs 27. The guide bar is then lowered by means of screw 20 until bearings 19 engage axle 13 so that the roll is held in contact with roll 8.

The sheets of dough are then passed between the rolls and cut into strips. As the strips meet the edge of presser bar 32, which rests upon roll 8, they are forced between disks 29 where they remain until forced outwardly by scraper 31, as shown in dot-and-dash lines in Fig. 4.

With the exception of an arm 33 formed on the guide bar and a pin 34 fixed in the frame, all the parts of the machine shown in Figs. 7 and 8 are identical with similar parts of the machine shown in Fig. 1 and, consequently, have been given the same reference numerals, the guide bar being designated by the reference character 18a as it differs from guide bar 18 only by the addition of arm 33.

The lower end of arm 33 is bifurcated to form a slot 35 which has a sliding fit on pin 34 so that the ends of the top roll are held at the same elevation, relatively to roll 8, and thus permit a sheet of dough of uniform thickness to be produced. Arm 33 may be secured to the guide bar at any suitable point, but has been shown as being a continuation of one side of one of bearings 19. By forming an arm 33 on each end of guide bar 18a and securing a pin 34 in each side of the frame, lugs 16 and guideways 17 may be omitted as the two arms and adjusting screw 20 will hold the top roll in position.

While we have shown certain embodiments of our invention, it is apparent that modifications may be made without departing from the spirit thereof and, hence, we do not wish to limit ourselves to the precise construction set forth but consider that we are at liberty to make such changes and alterations as fairly come within the scope of the appended claims.

We claim:—

1. In a machine having a single cutting roll carrying a series of spaced cutters for cutting dough into strips, means for separating the strips including a presser bar for forcing the strips between the cutters, and a scraper for forcing the strips out from between the cutters.

2. In a machine having a roll carrying a series of spaced cutters for cutting dough into strips, means for positively insuring the separation of the strips including scraper supports carried by the roll, a presser bar secured to the scraper supports and extending between the cutters to force the dough strips up between the cutters, and a scraper secured to the scraper supports and extending between the cutters.

3. In a machine having a single roll carrying a series of spaced cutters for cutting dough into strips, means for separating the strips including a presser-bar arranged to force the strips upward between the cutters.

4. In a machine having a single cutting roll provided with cutters spaced along the periphery thereof, a moving part for feeding the dough to said cutting roll, and a presser associated with the roll for forcing the dough between the cutters.

5. A macaroni machine comprising a frame, rolls journaled in the frame, one being a cutting roll made up of spaced discs, strippers for each of the discs, and a presser for forcing material between the discs in advance of action by the stripper.

In testimony whereof we have signed our names to this specification.

RAFFAELE BACCELLIERI.
AUGUSTO DE RENTIIS.